United States Patent Office 2,715,583
Patented Aug. 16, 1955

2,715,583

AGGREGATE COMPOSITION OF GRANULATED SLAG AND EXPANDED VERMICULITE

George E. Ziegler, Evanston, Ill., assignor to Zonolite Company, Chicago, Ill., a corporation of Montana No Drawing. Application December 3, 1952,
Serial No. 323,923

7 Claims. (Cl. 106—110)

This invention relates to an aggregate composition, and more particularly to an aggregate of granulated or expanded blast furnace slag and vermiculite as a plaster aggregate by itself or in combination with proper amounts of gypsum, lime, Portland cement, bentonite or other cementitious and plastic type binders, as an applied plaster or stucco, and for use in forming slabs or sheets when used with the proper amounts of gypsum, lime, Portland cement or other binders.

Sand aggregates have been used for a great many years in the making of plaster with gypsum, lime, Portland cement and other cementitious binders, but sand has the disadvantage that because of its own high density it greatly increases the density of the plaster mix. More recently, lightweight aggregates, such as perlite and vermiculite, have to some extent replaced sand as an aggregate for plasters, slabs, sheets, brick and blocks. Such lightweight aggregates, while having some advantages over sand in addition to the lowered density of plaster mix made possible by their use, have not been uniformly accepted by plasterers, largely, perhaps, because plaster made from these lightweight aggregates does not give the experienced plasterer the same "feel" as he is used to when working with a plaster employing a sand aggregate.

I have now found that if a granulated, or expanded, cellular slag, such as blast furnace, open hearth or other furnace slag from chemical processing industries, is used with vermiculite in the proportions by volume of between 20 to 60% of slag and the balance expanded vermiculite, a very superior plaster can be prepared. The slag should preferably be free from dense chunks and should contain at least 25% by weight of water-floatable slag. For purposes of comparison, gypsum plaster has been made with 100% sand, 100% vermiculite, and with varying proportions of vermiculite and granulated blast furnace slag within the range of proportions just given, and the resulting batches of plaster have been used on actual jobs in the field. The results obtained from the use of gypsum plaster made with varying proportions of vermiculite and granulated blast furnace slag within the stated proportions showed many advantages over gypsum plaster made with sand alone or with vermiculite alone, as the aggregate. These advantages include the following:

(1) Greater ease of working in the troweling operation. The plaster using the aggregate of my invention gave a "scratch" more nearly resembling that obtained when using a sand aggregate plaster than when a plaster containing a 100% vermiculite aggregate was used. In the rodding operation, a much larger gob of plaster mix builds up on the rod and the mix does not drop off so readily as a plaster mix made from either 100% sand or 100% vermiculite aggregate. Also, in the case of a plaster using my aggregate, the rod can be moved over the surface of the plaster to give a uniform thickness of plaster with a minimum of effort, because of the sharp character of the slag and the resulting substantial freedom of the plaster from any tendency to cause tearing, pulling or sticking. Although sand is sharp, it is not "plastic" and therefore results in a "mealy" surface, which when rodded tends to crumble and fall to the floor. Vermiculite is sticky and pulls, tending to cause tearing of the surface, but is "rich" and therefore does not tend to separate from the rod. The aggregate of my composition combines the virtues of the vermiculite and of the slag and avoids the disadvantages of vermiculite or of sand. The plaster containing the vermiculite-slag aggregate also can be darbied with greater ease;

(2) Greater freedom from cracking upon setting;

(3) Lower water requirements than the 100% vermiculite aggregate plaster, and greater latitude as to water requirement than the sand-plaster mix; that is, more freedom between lower and higher limits as to water content, thus providing more adaptability to job conditions;

(4) Greater adaptability to application as a thicker single coat or as a second coat before the first one has set. The application of a second coat over a first coat before the latter has set is called "doubling back." A plaster containing either sand or vermiculite can be doubled back on a side wall application. Sand plaster cannot be doubled back on a ceiling application, and on a side wall, there would be a thickness limitation because of the weight of the sand plaster. A vermiculite-slag plaster, however, can be doubled back on a ceiling and on a side wall the thickness limitation is not so restrictive as in the case of a sand plaster.

It is therefore an important object of this invention to provide an aggregate composition of granulated furnace slag and expanded vermiculite having superior properties and characteristics that particularly adapt it for use in plaster employing cementitious and plastic-type binders.

It is a further important object of this invention to provide an aggregate composition of a granulated, or expanded, furnace slag containing at least 25% by weight of water-floatable slag, and expanded vermiculite, mixed in such proportions as to impart improved properties to gypsum plaster made therewith, both with respect to the application of such plaster and also with respect to the coating of plaster resulting from such application.

Other and further important objects of this invention will become apparent from the following description and appended claims.

The furnace slag that I prefer to use is a granulated, cellular type that has a substantial proportion of water-floatable particles and is free from dense chunks. While blast furnace slag has been found most satisfactory, other furnace slags, such as open hearth slag and slag from chemical processing furnaces can also be used. One preferred type of blast furnace slag is substantially wholly composed of water-floatable material because of having been prepared by a water floating separation process. Another preferred type contains from 25% up to about 70% of water-floatable material. This latter type is made in a machine by pouring molten slag into high speed jets of water and separating out the denser particles. Both types of blast furnace slag are cellular in character and have relatively non-porous continuous outer surfaces.

The granulated blast furnace slag is first screened before being mixed with vermiculite to form the aggregate composition of my invention. The following represents a typical screen analysis of a suitable slag for my purposes:

| Percent Retained | On Designated Number Of Standard Screen Mesh |
|---|---|
| 0 | 6 |
| 60 | 14 |
| 100 | 28 |

In other words, all of the slag after screening will pass through a 6-mesh screen and all will be retained on a 28-mesh screen. The screened slag has a dry density of between 12 and 40 pounds per cubic foot after screening and in its then normal state of dryness, which usually runs 15% or less moisture content on an oven dry basis. Where the slag has been water-floated, the dry density will run less than 20 pounds per cubic foot, while for the machine made slag, which contains from 25% to 70% of water-floatable material, the dry density is generally above 20 pounds per cubic foot and up to as high as 40 pounds per cubic foot. These dry densities are considerably lower than that of an air-cooled slag, which will run between 80 and 100 pounds per cubic foot.

Granulated blast furnace slag of the density and particle size just described is mixed with expanded vermiculite of the standard plaster aggregate type. Such vermiculite has a dry density of less than 15 pounds per cubic foot. In accordance with my present invention, the proportions by volume are 20 to 60% slag, and 80 to 40% vermiculite.

If more than about 60% of slag were used, say, 70% or over, a gypsum plaster made with such an aggregate composition does not handle well. In general, the greater the proportion of slag, the greater the flexibility under lateral distortion loads without cracking. The compression strength of the plaster also increases with higher percentages of slag in the aggregate. A satisfactory combination of desirable properties in a vermiculite-slag plaster mix is obtained when the proportion of slag is kept between 20 and 60% of the total aggregate composition.

Furthermore, within the range indicated, the resulting plaster mix provides a base coat that has good "suction." By this is meant that the base coat will suck out, or absorb, water from the finished coat, which is usually a lime-gypsum mixture. A nice balance must be maintained as to the "suction" qualities of the base coat, since if too much water is left in the finish coat, it will blister, and if not enough water is left, there will not be sufficient water in the finish coat to furnish the water of crystallization required to set the gypsum. In the case of vermiculite aggregate, the base has too much suction, due to the capillary action of the vermiculite, which is much greater than that of granulated blast furnace slag. With the proper suction qualities in the base coat, the finish coat can be trowelled satisfactorily before the gypsum sets. The roughness of the slag in the base coat increases the mechanical bond between the base coat and the finish, or "white" coat. The mechanical adhesion of the white coat is very important because of the probable absence of any chemical bond between the average finish coat and the base coat.

The vermiculite-slag aggregate of my invention can be made into a very satisfactory gypsum plaster by mixing 2½ cubic feet of the aggregate with 100 pounds of gypsum. The amount of water required for such a mix will generally run from 9.5 to 11.75 gallons of water for each 100 pounds of gypsum in the mix. This will give a wet density of around 79 to 81 pounds per cubic foot and will yield about 2.6 to 2.8 cubic feet of wet plaster mix. On this same 100 pound gypsum unit basis, the wet plaster mix will give a coverage of around 8.5 to 10.5 square yards for an average wall thickness of about ½ inch.

A gypsum plaster made from a vermiculite-slag aggregate of my invention has certain other advantages over the use of a 100% vermiculite aggregate than those already mentioned. If more than 20% blast furnace slag is used in the aggregate, this gives sufficient grit to the plaster that the plaster is not dangerously slippery under foot when the workmen step on the droppings that inevitably fall upon the floor. Moreover, the percentage of droppings is reduced as compared with either a 100% sand aggregate or a 100% vermiculite aggregate plaster. Mention has also been made of the fact that plaster using my aggregate has a satisfactory "scratch." In other words, it has enough bite to keep the tools in clean, working condition, so as not to let the plaster chunks build up, and the plaster gives a similar feel to that of a sand aggregate plaster, with which most plasterers are familiar.

A Portland cement plaster may be prepared, using my aggregate composition, by mixing with 1 part of Portland cement from 4 to 8 parts of my aggregate, depending upon the strength and insulation properties required. The larger the proportion of aggregate, the weaker the resulting plaster but the better the insulating values. Somewhat more water can be used than where sand is used as the aggregate, when the plaster is applied to a vertical or sloping surface.

I claim as my invention:

1. An aggregate composition for use in making cementitious plasters comprising a mixture consisting essentially of from 20 to 60% by volume of a granulated furnace slag having a dry density of between 12 and 40 pounds per cubic foot and from 80 to 40% by volume of expanded vermiculite having a dry density of less than about 15 pounds per cubic foot.

2. An aggregate composition for use in making cementitious plasters comprising a mixture consisting essentially of from 20 to 60% by volume of a granulated furnace slag of a particle size largely between 6 and 28 standard mesh and having a dry density of between 12 and 40 pounds per cubic foot and from 80 to 40% by volume of expanded vermiculite having a dry density of less than about 15 pounds per cubic foot.

3. An aggregate composition for use in making cementitious plasters comprising a mixture consisting essentially of from 20 to 60% by volume of a granulated cellular blast furnace slag substantially free from dense chunks, the balance being expanded vermiculite.

4. An aggregate composition for use in making cementitious plasters comprising a mixture consisting essentially of from 20 to 60% by volume of a granulated cellular blast furnace slag that has been water floated and that is substantially free from dense chunks, and the balance being expanded vermiculite.

5. An aggregate composition for use in making cementitious plasters comprising a mixture consisting essentially of from 20 to 60% by volume of a granulated cellular blast furnace slag that has been water floated and that is substantially free from dense chunks, and the balance being expanded vermiculite having a dry density of less than about 15 pounds per cubic foot.

6. An aggregate composition for use in making cementitious plasters, said composition consisting essentially of from 20 to 60% by volume of a granulated cellular furnace slag of a particle size largely between 6 and 28 standard mesh, and from 80 to 40% by volume of an expanded vermiculite having a dry density of less than 15 pounds per cubic foot.

7. A gypsum plaster consisting essentially of about 2½ cubic feet of aggregate per 100 pounds of gypsum plaster binder, said aggregate consisting essentially of from 20 to 60% by volume of a granulated cellular furnace slag having a dry density of between 12 and 40 pounds per cubic foot and from 80 to 40% by volume of expanded vermiculite having a dry density of less than about 15 pounds per cubic foot.

References Cited in the file of this patent

UNITED STATES PATENTS

| Number | Name | Date |
|---|---|---|
| 1,226,292 | Willing et al. | May 15, 1917 |
| 1,912,544 | Slidell | June 6, 1933 |
| 1,916,971 | Denning | July 4, 1933 |
| 1,976,946 | Kliefoth | Oct. 16, 1934 |
| 1,991,393 | Joyce | Feb. 19, 1935 |
| 2,007,130 | Monroe et al. | July 2, 1935 |
| 2,342,574 | Denning | Feb. 22, 1944 |
| 2,226,348 | Rabb | Dec. 24, 1950 |

FOREIGN PATENTS

| Number | Country | Date |
|---|---|---|
| 409,530 | Great Britain | May 3, 1934 |